(12) United States Patent
Visharam et al.

(10) Patent No.: US 8,291,104 B2
(45) Date of Patent: *Oct. 16, 2012

(54) SCALABLE VIDEO CODING (SVC) FILE FORMAT

(75) Inventors: Mohammed Zubair Visharam, Santa Clara, CA (US); Ali Tabatabai, Cupertino, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 220 days.

This patent is subject to a terminal disclaimer.

(21) Appl. No.: 12/755,674

(22) Filed: Apr. 7, 2010

(65) Prior Publication Data

US 2010/0198887 A1 Aug. 5, 2010

Related U.S. Application Data

(63) Continuation of application No. 11/398,195, filed on Apr. 4, 2006, now Pat. No. 7,725,593.

(60) Provisional application No. 60/699,535, filed on Jul. 15, 2005.

(51) Int. Cl.
*G06F 15/16* (2006.01)

(52) U.S. Cl. .......... 709/231; 709/224; 709/219; 370/40; 707/2

(58) Field of Classification Search .................. 709/224, 709/231, 219; 370/40; 707/2
See application file for complete search history.

(56) References Cited

U.S. PATENT DOCUMENTS

| | | | |
|---|---|---|---|
| 6,757,450 B1 | 6/2004 | Gershony et al. | |
| 6,937,273 B1 | 8/2005 | Loui | |
| 6,937,723 B2 | 8/2005 | Boland et al. | |
| 7,043,059 B2 | 5/2006 | Cheatle et al. | |
| 7,047,241 B1 | 5/2006 | Erickson | |
| 7,284,041 B2 * | 10/2007 | Nakatani et al. | 709/219 |
| 7,383,288 B2 | 6/2008 | Miloushev et al. | |
| 7,965,722 B2 * | 6/2011 | Futch et al. | 370/401 |
| 2005/0084166 A1 | 4/2005 | Boneh et al. | |
| 2005/0235047 A1 | 10/2005 | Li et al. | |
| 2005/0275752 A1 | 12/2005 | Li et al. | |
| 2006/0120450 A1 | 6/2006 | Han et al. | |

(Continued)

FOREIGN PATENT DOCUMENTS

JP 2008527814 7/2008

(Continued)

OTHER PUBLICATIONS

Mohammed Zubair Visharam et al., "Supporting the Storage of MPEG-21: Part 13 Scalable Video by an extension of the ISO Base Media File Format," Oct. 2004, pp. 1-10, Palma de Mallorca, Spain.

(Continued)

*Primary Examiner* — Tammy Nguyen
(74) *Attorney, Agent, or Firm* — Haverstock & Owens LLP

(57) ABSTRACT

The currently existing ISO/AVC file format is modified by providing extensions to store and access video content currently being defined by the SVC standard. Specifically, extensions to the AVC file format are made to provide a new SVC file format that enables the storage and access of scalable video data. The scalable video data is stored as a single track within a media data section of the SVC file format. New extensions are defined for description entries and boxes within a metadata section of the SVC file format. These extensions provide means for extracting sub-streams or layers from the single track of scalable video data stored in the media data section.

25 Claims, 6 Drawing Sheets

U.S. PATENT DOCUMENTS

2006/0268991 A1 11/2006 Segall et al.
2008/0082482 A1* 4/2008 Amon et al. ............. 707/2
2010/0146082 A1* 6/2010 Isobe ..................... 709/219

FOREIGN PATENT DOCUMENTS

WO 2004036916 A1 4/2004

OTHER PUBLICATIONS

Mohammed Zubair Visharam et al., "Extensions to the ISO/AVC File Format to support the storage of the Scalable Video Coding (SVC) bit streams," Apr. 2005, pp. 1-9, Busan, Korea.

Jens-Rainer, Ohm, "SVC Requirements Specified by MPEG (ISO/IEC JCT 1/SC29/WG11)", Jan. 2005, Hong Kong, China.

Babonneau, Bethelot et. al., "Proposal for SVC Streams Storage and Transport With MGS Support", ISO/IEC JT1/SC29/WG11 MPEG2005/M12036, Apr. 2005, Busan, Korea.

Visharam, M.Z. et al., "Supporting the Storage of MPEG-21: Part 13 Scalable Video by an Extension of the ISO Base Media File Format", ISO/IEC JTC1/SC29/WG11 MPEG2004/M11422, Oct. 2004, Palma de Mallorca, Spain.

* cited by examiner

| AU1 | AU2 | AU3 | AU4 | AU5 | AU6 | AU7 | AU8 | AU9 | AU10 | AU11 | AU12 | • • •

Fig. 6

[Access Unit Delimiter NAL Unit (if present)] [Length] [SEI NAL Unit (if present)] [Length] [VCL Slice NAL Unit (primary coded picture)] [Length] [VCL Slice NAL Unit Scalable Extension] [Length] [VCL Slice NAL Unit Scalable Extension] [Length]

SCALABLE VIDEO CODING (SVC) FILE FORMAT

RELATED APPLICATIONS

This application is a continuation of co-pending U.S. patent application Ser. No. 11/398,195, filed on Apr. 4, 2006, entitled "SCALABLE VIDEO CODING (SVC) FILE FORMAT," which claims priority of U.S. provisional application, Ser. No. 60/699,535, filed Jul. 15, 2005, and entitled "Scalable Video Coding (SVC) file format", by the same inventors. The U.S. patent application Ser. No. 11/398,195, filed on Apr. 4, 2006, entitled SCALABLE VIDEO CODING (SVC) FILE FORMAT and the U.S. provisional application, Ser. No. 60/699,535, filed Jul. 15, 2005, and entitled "Scalable Video Coding (SVC) file format" are both hereby incorporated in their entirety by reference.

FIELD OF THE INVENTION

The present invention relates to the field of video encoding. More particularly, the present invention relates to the field of SVC encoding and extending the current AVC file format to support the storage of video coded data using scalable video coding.

BACKGROUND OF THE INVENTION

A file format is a particular way to encode information for storage in a computer file. The conventional manner of storing the format of a file is to explicitly store information about the format in the file system. This approach keeps the metadata separate from both the main data and the file name.

The ISO Base Media File Format is designed to contain timed media information or media data streams, such as a movie. The stored media information can be transmitted locally or via a network or other stream delivery mechanism. The files have a logical structure, a time structure, and a physical structure. The logical structure of the file includes a set of time-parallel tracks. The time structure of the file provides the tracks with sequences of data samples in time, and those sequences are mapped into a timeline of the overall media data stream by optional edit lists. The physical structure of the file separates the data needed for logic, time, and structural de-composition, from the media data samples themselves. This structural information is concentrated in a metadata box, possibly extended in time by metadata fragment boxes. The metadata box documents the logical and timing relationships of the data samples, and also includes pointers to where the data samples are stored.

Each media data stream is included in a track specialized for that media type (audio, video etc.), and is further parameterized by a sample entry. The sample entry includes the 'name' of the exact media type, for example the type of the decoder needed to decode the media data stream, and other parameters needed for decoding. There are defined sample entry formats for a variety media types.

Support for metadata takes two forms. First, timed metadata is stored in an appropriate track and synchronized with the media data it is describing. Second, there is general support for non-timed metadata attached to the media data stream or to an individual track. These generalized metadata structures are also be used at the file level in the form of a metadata box. In this case, the metadata box is the primary access means to the stored media data streams.

In some cases, the data samples within a track have different characteristics or need to be specially identified. One such characteristic is the synchronization point, often a video I-frame. These points are identified by a special table in each track. More generally, the nature of dependencies between track samples is documented in this manner. There is also the concept of sample groups. Sample groups permit the documentation of arbitrary characteristics that are shared by some of the data samples in a track. In the Advanced Video Coding (AVC) file format, sample groups are used to support the concept of layering and sub-sequences.

The AVC file format defines a storage format for video streams encoded according to the AVC standard. The AVC file format extends the ISO Base Media File Format. The AVC file format enables AVC video streams to be used in conjunction with other media streams, such as audio, to be formatted for delivery by a streaming server, using hint tracks, and to inherit all the use cases and features of the ISO Base Media File Format.

FIG. 1 illustrates an exemplary configuration of an AVC file format 10 including a media data section 20 and a metadata section 30. Each data stream is stored in the media data section 20. Multiple data streams can be stored in one file format. As shown in FIG. 1, four data streams 22, 24, 26, and 28 are stored in the media data section 20. For each data stream stored in the media data section of the AVC file format there is a corresponding track stored in the metadata section. In FIG. 1, a track 32 corresponds to the data stream 22, a track 33 corresponds to the data stream 24, a track 36 corresponds to the data stream 26, and a track 38 corresponds to the data stream 28. In general, there are N tracks stored in the metadata section for N data streams stored in the data section.

The H.264, or MPEG-4 Part 10, specification is a high compression digital video codec standard written by the ITU-T Video Coding Experts Group (VCEG) together with the ISO/IEC Moving Picture Experts Group (MPEG) in a collective effort partnership often known as the Joint Video Team (JVT). The ITU-T H.264 standard and the ISO/IEC MPEG-4 Part 10 standard (formally, ISO/IEC 14496-10) are technically identical, and the technology is also known as AVC, for Advanced Video Coding. It should be noted that H.264 is a name related to the ITU-T line of H.26x video standards, while AVC relates to the ISO/IEC MPEG side of the partnership project that completed the work on the standard, after earlier development done in the ITU-T as a project called H.26L. It is usual to call the standard as H.264/AVC (or AVC/H.264 or H.264/MPEG-4 AVC or MPEG-4/H.264 AVC) to emphasize the common heritage. Occasionally, it has also been referred to as "the JVT codec", in reference to the JVT organization that developed it.

Currently JVT is working on a new codec known as the Scalable Video Codec (SVC), which would be an extension to the existing AVC codec. Work on the SVC started independently in the MPEG domain initially as a part of the MPEG-21 standard in 2003. But during its development in 2004, it was merged with the activities of the JVT group with a focus towards developing coding technology that would be backwards compatible with the existing AVC codec. As such it currently is jointly developed by the JVT group in MPEG and ITU-T. The goal of the Scalable Video Codec (SVC) activity is to address the need and provide for scalability in the Spatial, Temporal and Quality (SNR) levels.

The existing file formats (ISO/MP4 and AVC) do not provide an easy and clear mechanism to extract the different variations of the spatial, temporal and SNR (quality) layers from the stored media data in the file format. Therefore, this information must be extracted by parsing the coded media stream, which is very inefficient and slow. Thus, there is a need to enhance and define new extensions to support the storage of emerging video coding standards such as SVC and to address the existing limitations of current file format storage methods. These new extensions define a structuring and grouping mechanism for the dependencies that exist in a group of pictures and within each sample to obtain a flexible stream structure that provides for spatial, temporal, and quality flexibility. The SVC standard proposes to encode the entire scalable media data as one single scalable bitstream, from which variants of temporal, spatial and quality layers can be extracted.

In the AVC standard, each video stream is encoded, and subsequently decoded, as an independent stream according to a particular frame rate, resolution, and quality. According to the SVC standard, from the single encoded video stream, referred to as a SVC elementary stream, multiple different types of video can be extracted, for example a low resolution video stream, a standard resolution video stream, or a high resolution video stream. To support the storage and extraction of such scalable video streams in the file format, the file formats need to be modified.

The SVC standard is currently under development and as the SVC standard defines a new design for a video codec, an appropriately defined new file format standard is also required to enable the storage and extraction of the new SVC video streams. To support the new SVC video streams, a new SVC file format is under development which extends the AVC file format to support the storage of the SVC video streams. However, specific extensions that define access to the stored scalable video have yet to be developed.

SUMMARY OF THE INVENTION

A system and method are described for extending the current ISO/MP4/AVC File Format to store video content, such as that coded using the MPEG-4: Part 10/Amd-1 Scalable Video Codec (SVC) standard whose development is currently under progress in MPEG/ITU-T. Specifically, extensions to the AVC file format are made to provide a new SVC file format that enables the storage and access of scalable video data. The scalable video data can be stored as a single track within a media data section of the SVC file format. New extensions are defined for description entries and boxes within a metadata section of the SVC file format. These extensions provide means for extracting sub-streams or layers from the single track of scalable video data stored in the media data section.

In one aspect, a modified file format includes a media data section to store a scalable data stream, and a metadata section including at least one track associated with the scalable data stream stored in the media data section, wherein each track comprises one or more metadata boxes to define and group a sub-layer data stream of the scalable data stream. The scalable data stream can comprise a scalable video stream. The scalable video stream can comprise a Scalable Video Coding (SVC) elementary stream. The modified file format can comprise a modified Scalable Video Coding (SVC) file format. The scalable data stream can comprise a single encoded track. The scalable data stream can comprise a series of access units. The one or more metadata boxes can be configured to define the sub-layer data stream according to one or more device requirements received from an end user device capable of processing the sub-layer data stream. The one or more metadata boxes can be further configured to define one of a plurality of description entries according to the one or more device requirements. The one or more metadata boxes can be further configured to define a sub-set of access units according to the selected description entry, wherein the defined sub-set of access units comprises the sub-layer data stream. The one or more metadata boxes can comprise a SVC Sample Group Description Box configured to define the one description entry. The one or more metadata boxes can comprise a SVC Sample To Group Box to define and group the sub-set of access units. The one or more metadata boxes can comprise extensions to the Scaling Video Coding (SVC) standards. The scalable data stream can comprise a plurality of sub-layer data streams. The one or more metadata boxes can be configured to define a hint track associated with the sub-layer data stream. The sub-layer data stream can comprise an Advanced Video Coding (AVC) compatible base layer stream.

In another aspect, a file server configured to utilize a modified file format is described. The file server includes a memory configured to store and extract data according to the modified file format, wherein the modified file format includes a media data section to store a scalable data stream, and a metadata section including at least one track associated with the scalable data stream stored in the media data section, wherein each track comprises one or more metadata boxes to define and group a sub-layer data stream of the scalable data stream. The file server also includes a processing module configured to provide control instruction to the memory and to extract the sub-layer data stream from the scalable data stream. The scalable data stream can comprise a series of access units. The file server can also include a network interface module configured to receive one or more device requirements from an end user device and to transmit the defined sub-layer data stream. The one or more metadata boxes can be configured to define one of a plurality of description entries according to the one or more device requirements. The one or more metadata boxes can be further configured to define a sub-set of access units according to the selected description entry, wherein the defined sub-set of access units comprises the sub-layer data stream. The one or more metadata boxes can comprise a SVC Sample Group Description Box configured to define the one description entry. The one or more metadata boxes can comprise a SVC Sample To Group Box to define and group the sub-set of access units. The scalable data stream can comprise a scalable video stream. The scalable video stream can comprise a Scalable Video Coding (SVC) elementary stream. The modified file format can comprise a modified Scalable Video Coding (SVC) file format. The scalable data stream can comprise a single encoded track. The scalable data stream can comprise a plurality of sub-layer data streams.

In yet another aspect, a system configured to utilize a modified file format is described. The system includes an end user device to transmit one or more device requirements and a file server configured to receive the one or more device requirements and to utilize the modified file system. The file server includes a memory and a processing module. The memory is configured to store and extract data according to the modified file format, wherein the modified file format comprises a media data section to store a scalable data stream, and a metadata section including at least one track associated with the scalable data stream stored in the media data section, wherein each track comprises one or more metadata boxes to define and group a sub-layer data stream of the scalable data stream according to the one or more device requirements. The processing module is configured to provide control instruction to the memory and to extract the sub-layer data stream from the media data section. The file server can also include a network interface module configured to receive the one or more device requirements from the end user device and to transmit the defined sub-layer data stream. The scalable data stream can comprise a series of access units. The one or more metadata boxes can be configured to define one of a plurality of description entries according to the one or more device requirements. The one or more metadata boxes can be further configured to define a sub-set of access units according to the selected description entry, wherein the defined sub-set of access units comprises the sub-layer data stream. The one or more metadata boxes can comprise a SVC Sample Group Description Box configured to define the one description entry. The one or more metadata boxes can comprise a SVC Sample To Group Box to define and group the sub-set of access units. The scalable data stream can comprise a scalable video stream. The scalable video stream can comprise a Scalable Video Coding (SVC) elementary stream. The modified file format can comprise a modified Scalable Video Coding (SVC) file format. The one or more metadata boxes can comprise extensions to the Scaling Video Coding (SVC) standards. The one or more metadata boxes can comprise extensions to the Scaling Video Coding (SVC) standards. The scalable data stream can comprise a single encoded track. The scalable data stream can comprise a plurality of sub-layer data streams. The one or more metadata boxes can be configured to define a hint track associated with the sub-layer data stream. The sub-layer data stream can comprise an Advanced Video Coding (AVC) compatible base layer stream.

In another aspect, a method of extracting a data stream from a modified file format is described. The method includes receiving a request for a specific data stream, wherein the request includes one or more device requirements, associating the request with a specific scalable data stream stored in a media data section of the modified file format, determining one or more tracks corresponding to the specific scalable data stream, wherein the one or more tracks are stored in a metadata section of the modified file format, further wherein each track comprises one or more metadata boxes, determining a sub-layer data stream of the specific scalable data stream according to the one or more device requirements, wherein the sub-layer data stream is determined using the one or more metadata boxes, and extracting the sub-layer data stream from the stored scalable data stream. The method can also include transmitting the extracted sub-layer data stream. The method can also include decoding the determined one or more tracks prior to determining the sub-layer data stream. The one or more metadata boxes can comprise extensions to the Scaling Video Coding (SVC) file format standards. The scalable data stream can comprise a scalable video stream. The scalable video stream can comprise a Scalable Video Coding (SVC) elementary stream. The modified file format can comprise a modified Scalable Video Coding (SVC) file format. The scalable data stream can comprise a single encoded track. The scalable data stream can comprise a series of access units. The method can also include configuring the one or more metadata boxes to define one of a plurality of description entries according to the one or more device requirements. The method can also include configuring the one or more metadata boxes to define a sub-set of access units according to the selected description entry, wherein the defined sub-set of access units comprises the sub-layer data stream. The one or more metadata boxes can comprise a SVC Sample Group Description Box configured to define the one description entry. The one or more metadata boxes can comprise a SVC Sample To Group Box to define and group the sub-set of access units. The one or more metadata boxes can comprise extensions to the Scaling Video Coding (SVC) standards. The scalable data stream can comprise a plurality of sub-layer data streams. The method can also include storing an encoded version of the scalable data stream in the media data section. The scalable data stream can be encoded according to a Scaling Video Coding (SVC) standard. The method can also include configuring the one or metadata boxes to define a hint track associated with the sub-layer data stream. The sub-layer data stream can comprise an Advanced Video Coding (AVC) compatible base layer stream.

BRIEF DESCRIPTION OF THE DRAWINGS

FIG. 6 illustrates an exemplary structure of a SVC access unit according to the SVC standard.

Embodiments of the modified file format are described relative to the several views of the drawings. Where appropriate and only where identical elements are disclosed and shown in more than one drawing, the same reference numeral will be used to represent such identical elements.

DETAILED DESCRIPTION OF THE EMBODIMENTS

Figure 1:
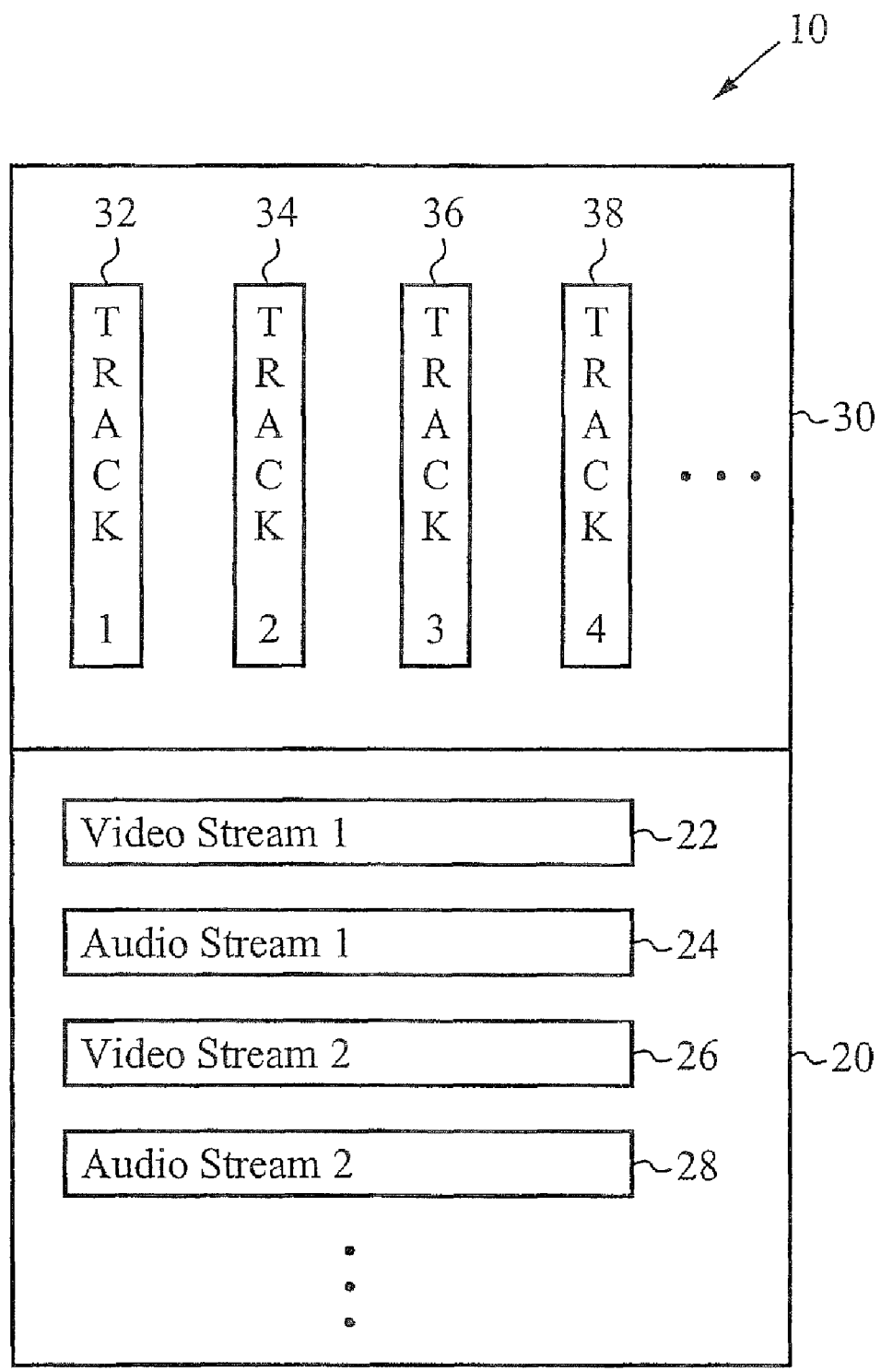
FIG. 1 illustrates an exemplary configuration of an AVC file format.
Figures 2, 4:
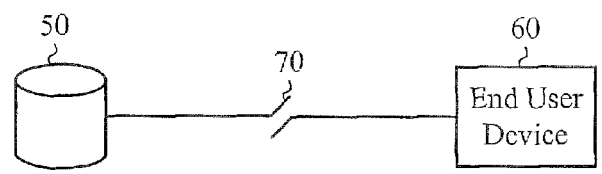
FIG. 2 illustrates a block diagram of an exemplary network including a file server configured to implement a modified file format.
FIG. 4 illustrates an exemplary configuration of a SVC elementary stream.

FIG. 2 illustrates a block diagram of an exemplary network including a file server configured to implement a modified file format. A file server 50 is coupled to a playback device 60 via a network 70. The network is any conventional network, wired or wireless, capable of transmitting data. The playback device 60 is any conventional device capable of receiving and processing transmitted data.

Figure 3:
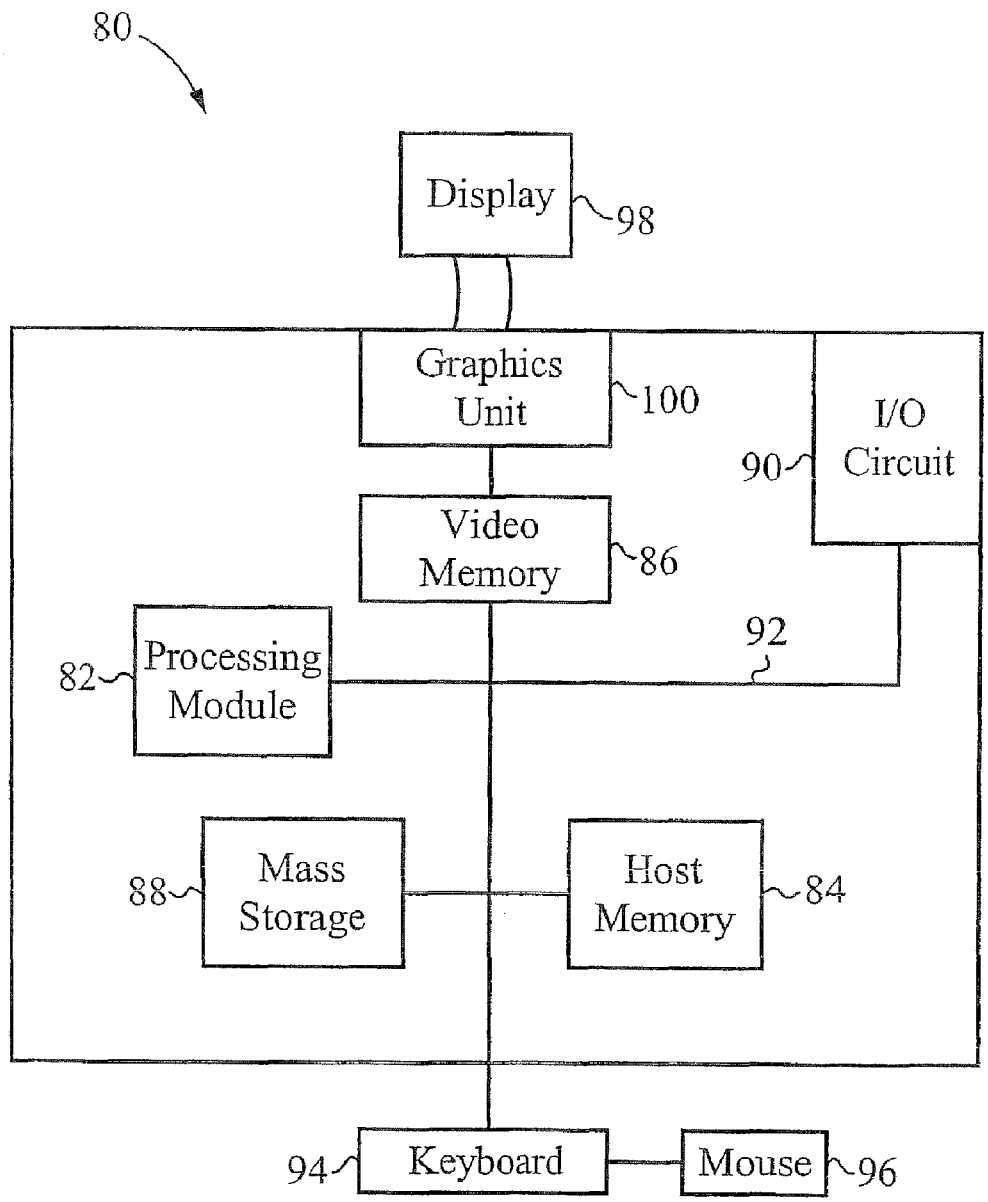
FIG. 3 illustrates an exemplary block diagram of the internal components of the file server of FIG. 2.

FIG. 3 illustrates an exemplary block diagram of the internal components of the file server 50 of FIG. 2. The file server 50 is any conventional computing device configurable to implement the modified file format. The file server 50 includes a processing module 82, a host memory 84, a video memory 86, a mass storage device 88, and an interface circuit 90, all coupled together by a conventional bidirectional system bus 92. The interface circuit 90 includes a physical interface circuit for sending and receiving communications over the network 70 (FIG. 3). The interface circuit 90 is implemented on a network interface card within the file server 50. However, it should be apparent to those skilled in the art that the interface circuit 90 can be implemented within the file server 50 in any other appropriate manner, including building the interface circuit onto the motherboard itself. The mass storage device 88 may include both fixed and removable media using any one or more of magnetic, optical or magneto-optical storage technology or any other available mass storage technology. The system bus 92 enables access to any portion of the memory 84 and 88 and data transfer between and among the CPU 82, the host memory 84, the video memory 86, and the mass storage device 88. Host memory 84 functions as system main memory, which is used by processing module 82.

The file server 50 is also coupled to a number of peripheral input and output devices including a keyboard 94, a mouse 96, and an associated display 98. The keyboard 94 is coupled to the CPU 82 for allowing a user to input data and control commands into the file server 50. The mouse 96 is coupled to the keyboard 94, or coupled to the CPU 82, for manipulating graphic images on the display 98 as a cursor control device. The file server 50 includes graphics circuitry 100 to convert data into signals appropriate for display. It is understood that the configuration of file server 50 shown in FIG. 3 is for exemplary purposes only and that file server 50 can be configured in any other conventional manner.

Since the SVC file format is an extension of the AVC file format, the SVC file format also includes a metadata section and a media data section. The media data section stores unaltered, encoded SVC elementary streams, such as video data streams, where the SVC elementary streams consist of a series of access units. FIG. 4 illustrates an exemplary configuration of a SVC elementary stream 40. The SVC elementary stream 40 includes a series of successive units, referred to as access units (AU). A decoder receiving the SVC elementary stream decodes each access unit into a picture, thereby producing a video sequence.

The metadata section stores information about each SVC elementary stream stored in the media data section. Such information includes, but is not limited to, the type of the video stream, the resolution(s) of the video stream, the frame rate(s) of the video stream, the storage address of each access unit in the video stream, random access points within the video stream, and timing as to when each access unit is to be decoded.

Scalable video streams enable adaptation to various networks. For example, if a scalable video stream is encoded at 60 frames per second, but a playback device only supports 30 frames per second, then only a portion of the scalable video stream is transmitted to the playback device. As another example, if the quality of the encoded scalable video stream is very high, say 10 Mbps, but the network over which the scalable video stream is to be transmitted only supports 1 Mbps, then again only a portion of the scalable video stream is transmitted to match the supported transmission speed of the network. In this manner, all or only portions of the encoded scalable video stream are extracted from the file format, based on the network or playback device requirements.

A scalable video stream is fully scalable in the sense that if the entire scalable video stream is decoded, the result is full resolution, full frame rate, and high quality. However, if the network or the playback device do not support the full resolution, the full frame rate, or the high quality of the entire scalable video stream, then only portions of the scalable video stream are extracted from the data section of the file format, and transmitted over the network, thereby conserving bandwidth.

For storage in the SVC file format, the scalable video stream is encoded according to the format defined in the SVC standard. The encoded scalable video stream is stored in the data section of the SVC file format. Tracks are stored in the metadata section of the SVC file format, where the tracks contain metadata information corresponding to the scalable video streams stored in the media data section. These tracks include information used to extract all or portions of the encoded scalable video streams stored in the data section of the SVC file format. Within each track, new metadata boxes are defined. The new metadata boxes define the parameters used for extracting various types of video streams from the scalable video stream. The parameters used to define an extracted video stream include, but are mot limited to, resolution, frame rate, and quality. For example, one extracted video stream corresponds to a low resolution requirement, a second extracted video stream corresponds to a standard resolution requirement, and a third extracted video stream corresponds to a high resolution requirement.

Figure 5:
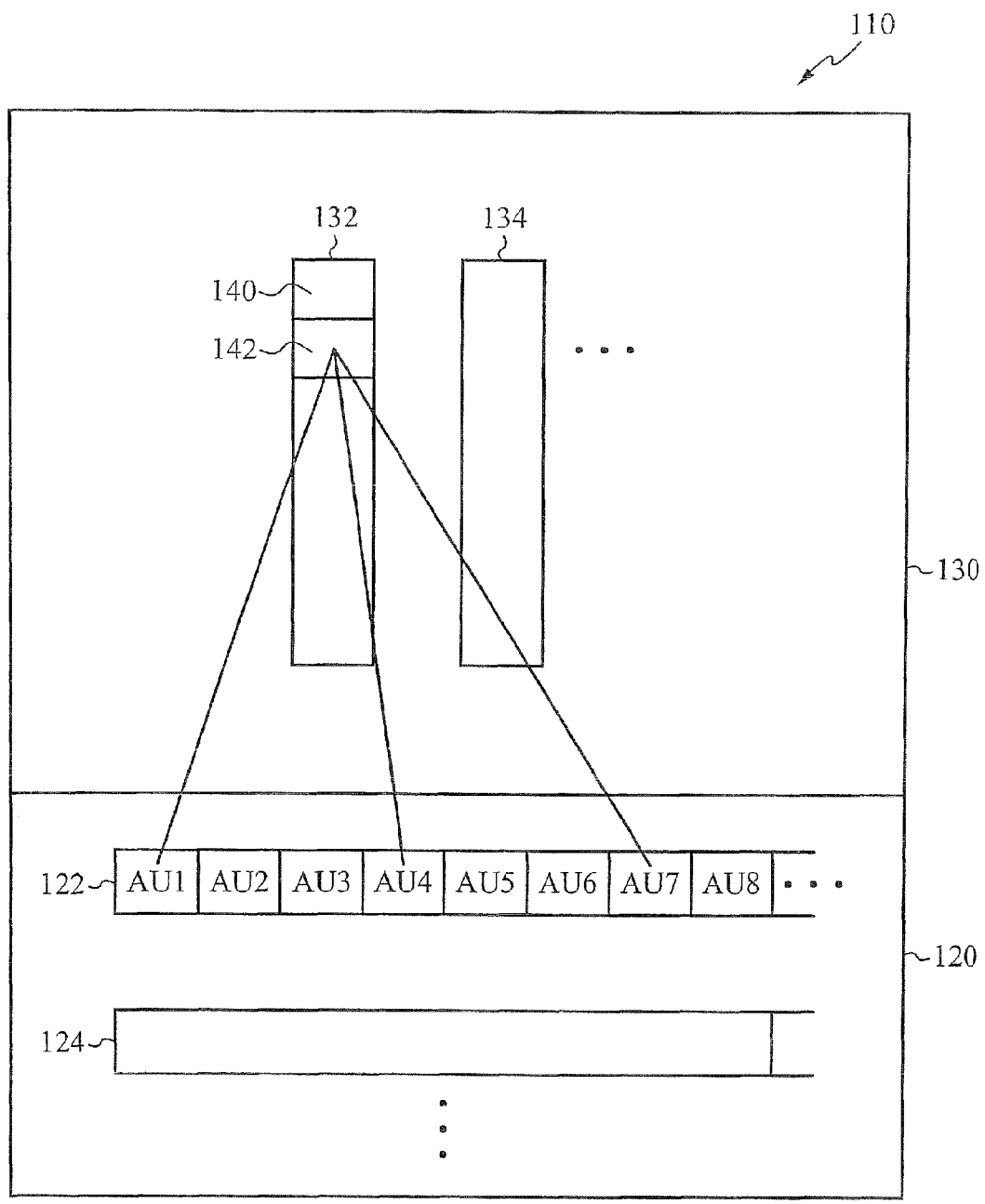
FIG. 5 illustrates an exemplary configuration of the modified SVC file format.

FIG. 5 illustrates an exemplary configuration of a modified SVC file format 110. The modified SVC file format 110 includes a media data section 120 and a metadata section 130. The media data section 120 includes one or more scalable data streams, or SVC elementary streams. The metadata section 130 includes one or more tracks. In one embodiment, there is one track in the metadata section 130 for each SVC elementary stream stored in the media data section 120. As shown in FIG. 5, the media data section 120 includes two SVC elementary streams 122 and 124. A track 132 in the metadata section 130 corresponds to the SVC elementary stream 122 stored in the media data section 120. A track 134 in the metadata section 130 corresponds to the SVC elementary stream 124 stored in the media data section 120. Each SVC elementary stream includes a series of access units. As shown in FIG. 5, SVC elementary stream 122 is expanded to show a portion of its access units.

New extensions are provided within the metadata section of the modified SVC file format to define and extract sub-layers within the stored scalable video streams, where a specific sub-layer data stream is determined by specified device requirements, such as resolution, frame rate, and/or quality. One or more metadata boxes are defined that identify and extract the specific access units that correspond to each sub-layer data stream. Each track is configured to include these one or more metadata boxes. FIG. 5 shows one embodiment in which a metadata box 140 and a metadata box 142 are defined to define and extract the specific access units that form the specific sub-layer data stream. In this embodiment, the metadata box 140 is referred to as a SampleGroupDescription Box and metadata box 142 is referred to as a SampleToGroup Box.

Referring to FIGS. 3 and 5, the playback device 60 sends a request to the file server 50 for a particular video stream, in this case the SVC elementary stream 122, stored in the media data portion 120 of the file format 110. The request includes the required specifications of the playback device 60, for example the specific resolution and frame rate supported. Upon receiving this request, the file server 50 matches the requested video stream, SVC elementary stream 122, to its corresponding track 132 in the metadata section 130. Using a file format decoder, only the matching track 132 is decoded. The file format decoder does not decode the other tracks stored in the metadata section 130 nor does the file format decode any of the encoded scalable video streams stored in the media data section 120, including the SVC elementary stream 122. Additionally, the media data stored in the media data section 120 is encoded differently than the metadata stored in the metadata section 130, and therefore requires a different decoder.

Once the track 132 is determined and decoded, the metadata box 140 is accessed. The metadata box 140 utilizes the one or more device requirements to determine a matching description entry. The matching description entry defines parameter values and a group_description_index value that correspond to the device requirements. The value of the group_description_index is used by the metadata box 142 to identify and extract specific access units in the corresponding SVC elementary stream 122. FIG. 5 illustrates the exemplary case where the metadata box 142 determines and extracts access units 1, 4, 7, and so on. The extracted access units remain unaltered and encoded. Once extracted, the access units are transmitted to the end user device as a sub-layer data stream that meets the device requirements originally provided.

In the embodiment described above in relation to FIG. 5, each scalable video stream is stored as a single video stream in the data section of the file format, and a corresponding one track associated with the single video stream is stored in the metadata section of the file format. New extensions are defined that provide means to extract sub-streams or layers of interest from the single video stream. Alternatively, more than one track can be associated with the single video stream.

As an example of this alternative embodiment, suppose a separate track is created for different end-user devices. Each of these devices can still have their own internal sub-sets of frame rates, spatial resolutions, quality, etc., which they can support. One scalable video stream supports various device requirements, such spatial resolutions (QCIF, CIF, SD and HD), frame rates (7.5, 15, 30, 60 fps), and various qualities for the above. The stream is still stored in the media data section of the modified file format. In the metadata section, there can be three tracks, for example. Each of the three tracks refers the same scalable video stream. However, each track operates on a sub-set of the entire scalable stream. For example, track 1 is customized for portable players (small screen size, low frame rate, etc), track 2 is customized for Standard TV, computers, etc (SD screen size, medium frame rate, etc), and track 3 is customized for HD players (large screen size, high frame rate, etc). Each track still includes the metadata boxes that define the description entries, since each track still supports some amount of variation (scalability). In this example, track 1 supports QCIF and CIF, 7.5 and 15 fps. Track 2 supports all of track 1 and SD and 30 fps. Track 3 supports all of track 2 and HD and 60 fps.

In this alternative embodiment, the specific video stream requested by the end user device does not correspond to a single track. Different methods are contemplated to determine the appropriate track in this case. First, the file server decodes a part of a track to determine the device requirements that it defines. Second, the file server parses the tracks at a high level to identify which one to use. Third, tracks have track headers that provide more information about the content they describe. In this particular case, the file server decodes some high level information from each track to decide which one to use. In general, any method that matches the device requirements received in the end user device request to the proper track can be used.

In one embodiment, extracting portions of a SVC elementary stream is supported by defining two new boxes, a SampleGroupDescription Box and a SVCSampleToGroup Box. These new boxes define features and fields that are used to identify which access units within the scalable video stream to extract. Each new description entry is defined within the SampleGroupDescription Box defines unique description entries, where each description entry refers to a different type of video streams that can be extracted from the SVC elementary stream. For example, if the SVC elementary stream is encoded to support three different resolutions, low, standard, and high, then there are three description entries, one description entry for each supported resolution. Each description entry defines the description entry fields, as described below, for that particular resolution, low, standard, or high. If the SVC elementary stream is encoded to support three different resolution, low, standard, and high, and also to support two different frame rates, high and low, then there are six different description entries, one for each combination of resolution and frame rate.

The SVC Dependency Description Entry, or simply 'description entry', documents and describes the various possible spatio-temporal combinations present within an SVC elementary stream. Each description entry is defined using a grouping type of 'svcd'. The description entries are ordered in terms of their dependency. The first description entry documents the base layer description and subsequent description entries document the enhancement layer descriptions. A group_description_index is used to index the ordered description entries. The group_description_index is also used to group the various SVC NAL units. Each SVC NAL unit refers to one of the description entries.—

Each SVC NAL unit in the SVC elementary stream is grouped using an index, the group_description_index, into the ordered list of description entries. NAL units referring to a particular index may require all or some of the NAL units referring to all the lower indices for proper decoding operation, but do not require any NAL unit referring to a higher index value. In other words, dependency only exist in the direction of lower layers.

In one embodiment, the file server determines the sub-set of indices required for proper decoding operation based on the values of the description fields present within the description entries, for example the resolution and/or temporal rate. In another embodiment, the end user device determines the sub-set of indices.

The grouping type used to refer to the ordered list of description entries is 'svcd'. The grouping type is used to link the entries present in this list to the SVCSampleToGroup Box, which includes the grouping of all the SVC samples and is described in greater detail below.

The following is an exemplary SVC Dependency Description Entry syntax:

```
class SVCDependencyDescriptionEntry ( ) extends
VisualSampleGroupEntry ('svcd')
{
        unsigned int (8) ProfileIndication;
        unsigned int (8) profile_compatibility;
        unsigned int (8) LevelIndication;
        unsigned int (8) temporal_level;
        unsigned int (8) dependency_id;
        unsigned int (8) temporalFrameRate;
        unsigned int (16) visualWidth;
        unsigned int (16) visualHeight;
        unsigned int (16) baseBitRate;
        unsigned int (16) maxBitRate;
        unsigned int (16) avgBitRate;
        unsigned int (8) progressiveRefinementLayerFlag;
        unsigned int (32) reserved = 0;
        //optional boxes or fields may follow when defined later
        ScalabilityInformationSEIBox( );
        //optional
}
class ScalabilityInformationSEIBox extends Box('seib')
{
//      contains all the fields as defined in Section 4.1 Scalability
Information SEI message syntax in JSVM 2.0 Reference encoding
description (N7084)
}
```

The variable profileIndication includes the profile code as defined in the AVC/SVC video specification. The variable profile_compatibility is a byte defined exactly the same as the byte which occurs between the profile_DC and level_DC in a sequence parameter set, as defined in the AVC/SVC video specification. The variable levelIndication includes the level code as defined in AVC/SVC video specification. The profileIndication and levelIndication fields indication fields present in each entry provide the profile and level values to which the particular layer is compatible. The variable temporal_level takes the value of the temporal_level syntax element present in the scalable extension NAL unit defined in the AVC/SVC video specification. This non-negative integer indicates the temporal level that the sample provides along time. The lowest temporal level is numbered as zero and the enhancement layers in the temporal direction are numbered as one or higher. The temporal_level field takes a default value of zero, in the case of AVC NAL units. In SVC Scalable Extension NAL units, if the extension_flag is equal to 0, then the parameters that specify the mapping of simple_priority_id to temporal_level are present in the SPS and are mapped accordingly.

The variable dependency_id takes the value of the dependency_id syntax element present in the scalable extension NAL unit defined in the AVC/SVC video specification. The dependency_id is a non-negative integer, with the value zero signaling that the NAL units corresponds to the lowest spatial resolution, and all higher values signal that the enhancement layers provide an increase either in spatial resolution and/or quality, for example coarse grain scalability. The dependency_id also controls the spatial scalability. The dependency_id field takes a default value of zero in the case of AVC NAL units. In SVC Scalable Extension NAL units, if the extension_flag is equal to 0, then the parameters that specify the mapping of simple_priority_id to dependency_id are present in the SPS and are mapped accordingly. The variable temporalFrameRate indicates the temporal frame rate that is associated with the temporal level field in the entry. The variable visualWidth gives the value of the width of the coded picture in pixels in this layer of the SVC stream. The variable visualHeight gives the value of the height of the coded picture in pixels in this layer of the SVC stream. The variable baseBitRate gives the bitrate in bits/second of the minimum quality that is provided by this layer without any progressive refinements. NAL units in this and lower levels that fall within the dependency hierarchy are taken into account in the calculation. The variable maxBitRate gives the maximum rate in bits/second that is provided by this layer over any window of one second. NAL units in this and lower levels that fall within the dependency hierarchy are taken into account in the calculation. The variable avgBitRate gives the average bit rate bits/second. NAL units in this and lower levels are taken into account in the calculation. The variable progressiveRefinementLayerFlag, when true, indicates that this layer contains progressive refinement NAL units, and is FGS scalable.

A SVCSampleToGroup Box is used to extract SVC scalable sub-streams from the SVC Elementary stream stored in the SVC file format, depending on the constraints imposed in terms of temporal, spatial and quality requirements. The SVCSampleToGroup Box provides the grouping information for each NAL unit of an SVC sample. The grouping information is provided by means of a group_description_index, which associates each NAL unit with its description information present in the SVCDependencyDescriptionEntry. The group_description_index refers to a specific description entry. The group_description_index ranges from 1 to the number of sample group entries in the SampleGroupDescription Box. Each NAL unit within the access units is assigned a specific group_description_index value. The requirements specified by the end user device ultimately determine a specific group_description_index value. All NAL units within the access units that are assigned the determined group_description_index value, or those NAL units within the access units with a group_description_index value lower than the determined group_description_index value, are extracted from the stored scalable video stream in the media data section of the file format. Those extracted access units are transmitted to the end user device. In this manner, portions of a single scalable video stream can be extracted and transmitted to an end user device depending on the requirements specified by the end user device.

The following is an exemplary SVCSampleToGroup Box syntax:

```
aligned (8) class SVCSampleToGroupBox extends FullBox ('svcg',
version = 0, 0)
{
    unsigned int (32) grouping_type; // Grouping Type 'svcd'
    unsigned int sample_count; // calculated from the sample to
    chunk box
    for (int i=1; i <= sample_count; i++)
    {
        unsigned int (8) numberOfNalUnits;
        for (int j=1; j <= numberOfNalUnits; j++)
        {
            unsigned int (8)        group_description_index;
            unsigned int (1)        isDiscardableNalUnitFlag;
            unsigned int (1)        isPRNalUnitFlag;
            unsigned int (2)        quality_level;
            unsigned int (4)        reserved = 0;
        }
    }
}
```

The variable grouping_type is an integer that identifies the type of sample grouping used. It links the SVCSampleToGroup Box to its associated sample group description table having the value 'svcd' for the grouping type. The variable sample_count denotes the number of samples that are present in the media track for the SVC Elementary stream, and is an inferred value that is calculated using the Sample to Chunk Box. The variable numberOfNalUnits is an integer that gives the number of NAL units present in a SVC sample. The variable group_description_index is an integer that gives the index of the sample group entry which describes the NAL units in this group. The index ranges from 1 to the number of sample group entries in the particular SampleGroupDescription Box, or takes the value 0 to indicate that the particular SVC Sample is a member of no group of this type. The variable is DiscardableNalUnitFlag is a flag, the semantics of which are specified in the NAL unit semantics of the AVC video specification. The variable is PRNalUnitFlag is a flag, which if equal to 1, indicates that this NAL unit is a progressive refinement NAL unit. The variable quality_level specifies the quality level for the current NAL unit as specified in the NAL unit header or in the quality_level_list[ ]. If absent, its value is inferred to be zero.

The sub-sample information box defined in the ISO base syntax cannot be easily used for defining a SampleToGroup box used to extract select portions of the SVC Elementary stream. First, sub-sample information box does not have a 'grouping_type' indicator to map to the relevant description entries. Second, the sub-sample information box is inefficient for this purpose, since the sub-sample information box requires a (32) bit entry called 'sample_count'. This was originally intended to indicate a run of samples, but in the case of SVC File Format, each SVC Sample may have a variable number of subsample_count, making the use of this sample_count mandatory for each SVC sample. Third, the new file format does not need to signal each subsample size, since a count of NAL units is used and the lengths of each NAL unit are already specified before them.

FIG. 6 illustrates an exemplary structure of an SVC Sample, or SVC access unit, according to the SVC standard. SVC Samples are externally framed and have a size supplied by that external framing. The SVC access unit is made up of a set of NAL units. Each NAL unit is represented with a length, which indicates the length in bytes of the following NAL Unit. The length field is configured to be of 1, 2, or 4 bytes. The configuration size is specified in the decoder configuration record. Each NAL Unit contains the NAL unit data as specified in ISO/IEC AVC/SVC video specification.

The SVC Decoder Configuration Record includes the size of the length field used in each sample to indicate the length of its contained NAL units as well as the initial parameter sets. The SVC Decoder Configuration Record is externally framed, meaning its size is supplied by the structure that contains it. The SVC Decoder Configuration Record also includes a version field. Incompatible changes to the SVC Decoder Configuration Record are indicated by a change of version number.

When used to provide the configuration of a parameter set elementary stream or a video elementary stream used in conjunction with a parameter set elementary stream, the configuration record contains no sequence or picture parameter sets, for example the variables numOfSequenceParameterSets and numOfPictureParameterSets both have the value.

The values for SVCProfileIndication, SVCLevelIndication, and the flags which indicate profile compatibility valid for all parameter sets of the scalable video stream. The level indication indicates a level of capability equal to or greater than the highest level indicated in the included parameter sets. Each profile compatibility flag is set if all the included parameter sets set that flag. The profile indication indicates a profile to which the entire stream conforms. The individual profiles and levels of each layer are documented in the SVCDependencyDescriptionEntry box.

The following is an exemplary SVC Decoder Configuration Record syntax:

```
aligned (8) class SVCDecoderConfigurationRecord {
    unsigned int (8) confiqurationVersion = 1;
    unsigned int (8) SVCProfileIndication;
    unsigned int (8) profile_compatibility;
    unsigned int (8) SVCLevelIndication;
    bit (6) reserved = '111111'b;
    unsigned int (2) lengthSizeMinusOne;
    bit (3) reserved = '111'b;
    unsigned int (5) numOfSequenceParameterSets;
    for (i=0; i< numOfSequenceParameterSets; i++) {
        unsigned int (16) sequenceParameterSetLength;
        bit (8*sequenceParameterSetLength)
        sequenceParameterSetNALUnit;
    }
    unsigned int (8) numOfPictureParameterSets;
    for (i=0; i< numOfPictureParameterSets; i++) {
        unsigned int (16) pictureParameterSetLength;
        bit (8*pictureParameterSetLength)
        pictureParameterSetNALUnit;
    }
}
```

The variable SVCProfileIndication contains the profile code as defined in the SVC specification. The variable profile_compatibility is a byte defined the same as the byte which occurs between the profile_IDC and level_IDC in a sequence parameter set, as defined in the AVC specification. The variable SVCLevelIndication contains the level code as defined in the AVC specification. The variable lengthSizeMinusOne indicates the length in bytes of the NALUnitLength field in an SVC video sample or SVC parameter set sample of the associated stream minus one. For example, a size of one byte is indicated with a value of 0. The value of this field is one of 0, 1, or 3 corresponding to a length encoded with 1, 2, or 4 bytes, respectively. The variable numOfSequenceParameterSets indicates the number of sequence parameter sets that are used as the initial set of sequence parameter sets for decoding the SVC elementary stream. The variable sequenceParameterSetLength indicates the length in bytes of the sequence parameter set NAL unit as defined in the AVC specification. The variable sequenceParameterSetNALUnit contains a sequence parameter set NAL Unit, as specified in the AVC specification. Sequence parameter sets occur in order of ascending parameter set identifier with gaps being allowed. The variable numOfPictureParameterSets indicates the number of picture parameter sets that are used as the initial set of picture parameter sets for decoding the SVC elementary stream. The variable pictureParameterSetLength indicates the length in bytes of the picture parameter set NAL unit as defined in the AVC specification. The variable pictureParameterSetNALUnit contains a picture parameter set NAL Unit, as specified in the AVC specification. Picture parameter sets occur in order of ascending parameter set identifier with gaps being allowed.

As described herein, the scalable SVC video stream is stored as a single track. If the scalable SVC video stream has a base layer that is AVC compatible, then those AVC compatible NAL units that are present in each SVC sample are grouped together using the new extensions as previously described. To find which entries are AVC compatible, the Profile and Level Indicators present in the SVCDependencyDescriptionEntries are used to parse through the SVCSampleToGroup Box and extract only those NAL units from each SVC Sample that are AVC compatible.

The modified SVC file format is derived from the ISO Base Media File Format. As such, there is a correspondence of terms in the modified SVC file format and the ISO Base Media File Format. For example, the terms stream and access unit used in the modified SVC file format correspond to the terms track and sample, respectively, in the ISO Base Media File Format.

In the terminology of the ISO Base Media File Format specification, SVC tracks (both video and parameter set tracks) are video or visual tracks. They therefore use a handler_type of 'vide' in the HandlerBox, a video media header 'vmhd', and, as defined below, a derivative of the VisualSampleEntry.

The sample entry and sample format for SVC video elementary streams are defined below. Definitions include:
Box Types: 'avc1', 'avcC', 'svc1', 'svcC'
Container: Sample Table Box ('stbl')
Mandatory: Either the avc1 (if base layer is AVC) or svc1 box is mandatory.
Quantity: One or more sample entries may be present To retain backwards compatibility with AVC, two types of visual sample entries are defined. First, if an SVC Elementary stream contains an AVC compatible base layer, then an AVC visual sample entry ('avc1') is used. Here, the entry contains initially an AVC Configuration Box, followed by an SVC Configuration Box as defined below. The AVC Configuration Box documents the Profile, Level and Parameter Set information pertaining to the AVC compatible base layer as defined by the AVCDecoderConfigurationRecord, in the AVC File Format specification. The SVC Configuration Box documents the Profile, Level and Parameter Set information pertaining to the SVC compatible enhancement layers as defined by the SVCDecoderConfigurationRecord, defined below. If the SVC Elementary stream does not contain an AVC base layer, then an SVC visual sample entry ('svc1') is used. The SVC visual sample entry contains an SVC Configuration Box, as defined below. This includes an SVCDecoderConfigurationRecord, also as defined below. Multiple sample descriptions are used, as permitted by the ISO Base Media File Format specification, to indicate sections of video that use different configurations or parameter sets.

The following is an exemplary AVC Configuration Box and the SVC Configuration Box syntax:

```
// Visual Sequences
class AVCConfigurationBox extends Box ('avcC') {
        AVCDecoderConfig-urationRecord ( ) AVCConfig;
}
class SVCConfigurationBox extends Box ('svcC') {
        SVCDecoderConfigurationRecord ( ) SVCConfig;
}
//      Use this if base layer is AVC compatible
class AVCSampleEntry( ) extends VisualSampleEntry ('avc1') {
        AVCConfigurationBox avcconfig;
        SVCConfigurationBox svcconfig;
        MPEG4BitRateBox ( );                    // optional
        MPEG4ExtensionDescriptorsBox ( );       // optional
}
//      Use this if base layer is NOT AVC compatible
class SVCSampleEntry( ) extends VisualSamplesntry ('svc1') {
        SVCConfigurationBox svcconfig;
        MPEG4BitRateBox 0;                      // optional
        MPEG4ExtensionDescniptorsBox ( );       // optional
}
```

The variable Compressorname in the base class VisualSampleEntry indicates the name of the compressor used with the value "\012AVC Coding" or "\012SVC Coding" being recommended (\012 is 10, the length of the string as a byte). If a separate parameter set stream is used, the variables numOfSequenceParameterSets and numOfPictureParameterSets must both be zero.

Figure 7:
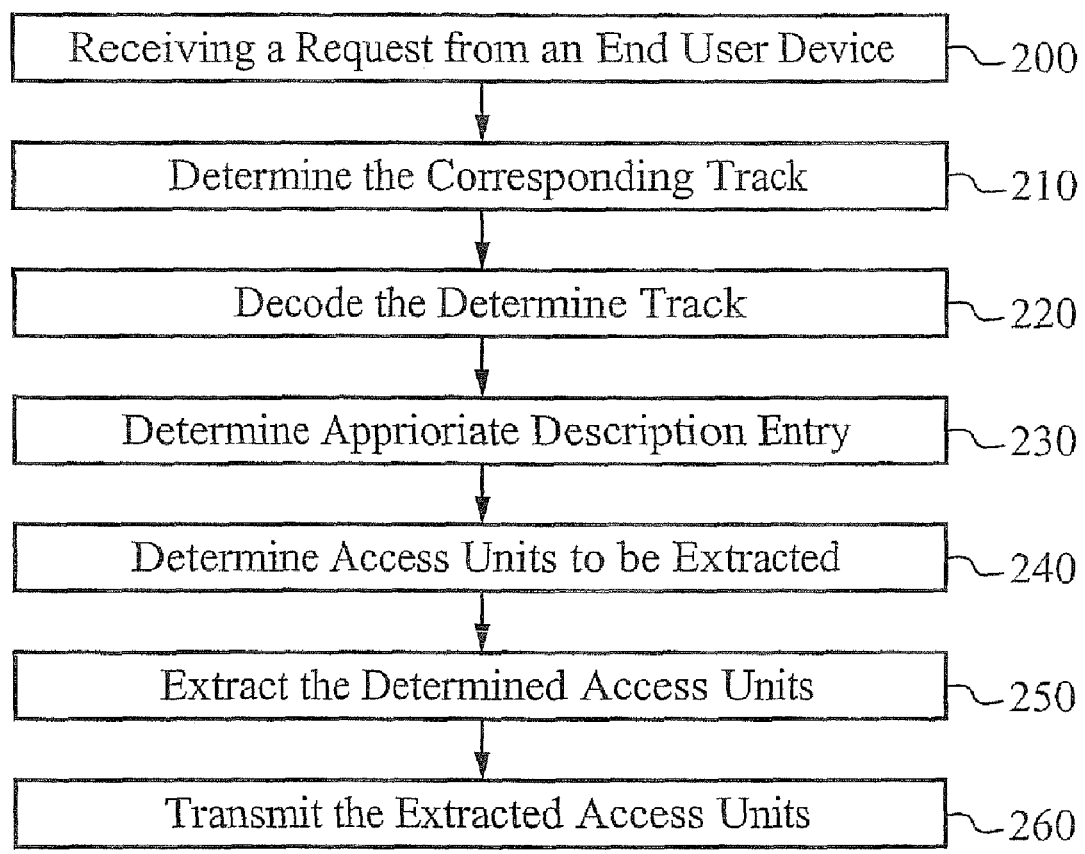
FIG. 7 illustrates an exemplary method of implementing the modified SVC file format.

The format of a sample in an SVC video elementary stream is configured via the decoder specific configuration for the SVC elementary stream. The SVC Sample contains all the NAL units pertaining to all the scalable levels that are present for the primary coded picture as shown in FIG. 7.

The following is an exemplary SVC Sample syntax:

```
aligned (8) class SVCSample
{
    unsigned int PictureLength = sample_size;   // SVCSample Size from SampleSizeBox
    for (i=0; i<PictureLength; )                // till the end of the picture
    {
        unsigned int ( (SVCDecoderConfigurationRecord.LengthSizeMinusOne+1) * 8)
        NALUnitLength;
        bit (NALUnitLength * 8) NALUnit;
        i + = (SVCDecoderConfigurationRecord.LengthSizeMinusOne+1) + NALUnitLength;
    }
}
```

The variable NALUnitLength indicates the size of a NAL unit measured in bytes. The length field includes the size of both the one byte NAL header and the EBSP payload but does not include the length field itself. The variable NALUnit contains a single NAL unit. The syntax of an NAL unit is as defined in the ISO/IEC AVC/SVC video specification and includes both the one byte NAL header and the variable length encapsulated byte stream payload.

The definition for the AVC Parameter Set Elementary stream as specified in the AVC File Format also applies in this case for the storage of SVC Parameter Sets as separate elementary streams.

The width and height in the VisualSampleEntry document the correct cropped largest spatial resolution in terms of pixels that is obtained by decoding the entire scalable bitstream.

To obtain the individual width and height of each layer, the group description entries are evaluated. Unless otherwise specified herein, all other definitions as specified in the AVC File Format Specification apply.

In general, the new SVC file format extensions provide for access and adaptation of fully scalable and layered scalable streams. The grouping methodology enables the creation of multiple Group Description Entries, wherein each description entry describes the properties of a scalable layer and its possible refinements in the case of fully scalable streams. Each description entry documents the temporal frame rate (temporal scalability), the spatial dimensions (spatial scalability), the range of bit-rates available from this layer, indicates if this layer is Fine Grain Scalable, the profile and level indications, and dependency information. The dependency hierarchy is easily maintained by the index of the group description entries where each higher index indicates that it depends on all or some of the lower layers described by the entries below it. The SampleToGroup box maps each NAL unit of a SVC sample to its group_description_index. This allows for an efficient method of reading, parsing and skipping any un-needed data. If the entire scalable sample is desired, then the whole SVC sample is read. If only particular scalable layers are desired, then those NAL units (VCL or otherwise) that do not map to the desired layer are skipped while parsing.

The modified file format defines a mechanism to access and extract the entire scalable layer, or portions thereof, stored in the file format. For transmission over a network and for possible adaptation of the coded data over the network, either the scalability information in the SEI messages is used, or alternative rules to drop un-desired NAL units over the network are used. One possibility is to define rules as part of the RTP mapping process to enable such alternative functionality.

The modified file format is backwards compatible with the existing AVC File Format specification to the fullest extent. There is no change in the DecoderConfiguration, Sample syntax structure and elementary stream structure when storing AVC compatible streams. The File Type indication signals the presence of an AVC compatible base layer stream by using the brand 'avc1' in its compatible_brands list. The presence of AVC compatible streams is detected by reading the Profile/Level Indicators present in each group_description_entry. Alternatively, a separate 'hint' track is also created for the AVC compatible base layer stream.

In one embodiment, the extracted access units are transmitted over the network using Real-time Transport Protocol (RTP). RTP has its own headers which are added to the payload, in this case the extracted access units. The hint tracks include pre-generated RTP headers and pointers to the scalable data. When the file server transmits the extracted access units, the proper hint track is accessed to retrieve the pre-generated RTP headers and pointers, thereby eliminating the additional overhead of generating the RTP headers.

Each sample in an AVC hint track stores information referring to the AVC Base Layer compatible NAL units in the scalable video stream. All NAL units within this sample have the same timestamp.

Following is a sample syntax for an AVC hint track:

```
aligned (8) class AVCHintsample {
    unsigned int (32)        sample_index;
    unsigned int (8)         nalunitcount;
    unsigned int (8)         reserved;
}
```

The variable sample_index indicates the sample number of the SVC sample that contains AVG base layer NAL units. The variable nalunitcount indicates the number of consecutive NAL units from the beginning of the SVC sample that are AVG compatible.

FIG. 7 illustrates an exemplary method of implementing the modified SVC file format. At the step 200, a file server configured to implement the modified SVC file format receives a request from an end user device. The request identifies the name of a specific data stream to be transmitted. The specific data stream corresponds to a specific scalable data stream stored in the modified file format. The request also includes device requirements of the end user device, such as a supported resolution and frame rate. At the step 210, the file server determines a track associated with the specified data stream. At the step 220, the file server decodes the track determined in the step 210. At the step 230, one or more metadata boxes within the decoded track are used to determine a description entry associated with the device requirements. In one embodiment, the decoded track includes a SampleGroupDescription Box which is used to determine the associated description entry. In this embodiment, the description entry defines parameter values corresponding to the device requirements. At the step 240, the one or more metadata boxes are used to determine the access units, and the specific NAL units within each access unit, within the specific scalable data stream. The specific NAL units within the access units are determined according to description entry determined in the step 230. In one embodiment, the decoded track includes a SampleToGroup Box which is used to determine the specific access units. At the step 250, the specific access units determined in the step 240 are extracted from the specific scalable data stream. The extracted access units are a sub-layer data stream of the specific scalable data stream. The sub-layer data stream matches the device requirements received in the step 200 and is therefore supported by the end user device. At the step 260, the sub-layer data stream is transmitted to the end user device.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A method of extracting a data stream from a modified file format implemented on a device, the method comprising:

a. receiving a request for a specific data stream, wherein the request includes one or more device requirements;
b. associating the request with a specific scalable data stream stored in a media data section of the modified file format;
c. determining one or more tracks corresponding to the specific scalable data stream, wherein the one or more tracks are stored in a metadata section of the modified file format, further wherein each track comprises one or more metadata boxes;
d. determining a sub-layer data stream of the specific scalable data stream according to the one or more device requirements, wherein the sub-layer data stream is determined using the one or more metadata boxes; and
e. extracting the sub-layer data stream from the stored scalable data stream.

2. The method of claim 1 further comprising transmitting the extracted sub-layer data stream.

3. The method of claim 1 further comprising decoding the determined one or more tracks prior to determining the sub-layer data stream.

4. The method of claim 1 wherein the one or more metadata boxes comprise extensions to the Scaling Video Coding (SVC) file format standards.

5. The method of claim 1 wherein the scalable data stream comprises a scalable video stream.

6. The method of claim 5 wherein the scalable video stream comprises a Scalable Video Coding (SVC) elementary stream.

7. The method of claim 1 wherein the modified file format comprises a modified Scalable Video Coding (SVC) file format.

8. The method of claim 1 wherein the scalable data stream comprises a single encoded track.

9. The method of claim 1 wherein the scalable data stream comprises a series of access units.

10. The method of claim 9 further comprising configuring the one or more metadata boxes to define one of a plurality of description entries according to the one or more device requirements.

11. The method of claim 9 further comprising configuring the one or more metadata boxes to define a sub-set of access units according to the selected description entry, wherein the defined sub-set of access units comprises the sub-layer data stream.

12. The method of claim 11 wherein the one or more metadata boxes comprise a SVC Sample Group Description Box configured to define the one description entry.

13. The method of claim 12 wherein the one or more metadata boxes comprise a SVC Sample To Group Box to define and group the sub-set of access units.

14. The method of claim 1 wherein the one or more metadata boxes comprise extensions to the Scaling Video Coding (SVC) standards.

15. The method of claim 1 wherein the scalable data stream comprises a plurality of sub-layer data streams.

16. The method of claim 1 further comprising storing an encoded version of the scalable data stream in the media data section.

17. The method of claim 16 wherein the scalable data stream is encoded according to a Scaling Video Coding (SVC) standard.

18. The method of claim 1 further comprising configuring the one or metadata boxes to define a hint track associated with the sub-layer data stream.

19. The method of claim 18 wherein the sub-layer data stream comprises an Advanced Video Coding (AVC) compatible base layer stream.

20. A method of extracting a data stream from a modified file format implemented on a device, the method comprising:
   a. receiving a request for a specific data stream, wherein the request includes one or more device requirements;
   b. associating the request with a specific scalable data stream stored in a media data section of the modified file format, wherein the scalable data stream comprises a series of access units and a plurality of sub-layer data streams;
   c. determining one or more tracks corresponding to the specific scalable data stream, wherein the one or more tracks are stored in a metadata section of the modified file format, further wherein each track comprises one or more metadata boxes;
   d. determining a sub-layer data stream of the specific scalable data stream according to the one or more device requirements, wherein the sub-layer data stream is determined using the one or more metadata boxes; and
   e. extracting the sub-layer data stream from the stored scalable data stream.

21. The method of claim 20 further comprising configuring the one or more metadata boxes to define one of a plurality of description entries according to the one or more device requirements.

22. The method of claim 20 further comprising configuring the one or more metadata boxes to define a sub-set of access units according to the selected description entry, wherein the defined sub-set of access units comprises the sub-layer data stream.

23. The method of claim 22 wherein the one or more metadata boxes comprise a SVC Sample Group Description Box configured to define the one description entry.

24. The method of claim 23 wherein the one or more metadata boxes comprise a SVC Sample To Group Box to define and group the sub-set of access units.

25. A method of extracting a data stream from a modified Scalable Video Coding (SVC) file format implemented on a device, the method comprising:
   a. receiving a request for a specific data stream, wherein the request includes one or more device requirements;
   b. associating the request with a specific scalable data stream stored in a media data section of the modified Scalable Video Coding (SVC) file format;
   c. determining one or more tracks corresponding to the specific scalable data stream, wherein the one or more tracks are stored in a metadata section of the modified Scalable Video Coding (SVC) file format, further wherein each track comprises one or more metadata boxes, wherein the one or more metadata boxes comprise extensions to the Scalable Video Coding (SVC) standards;
   d. determining a sub-layer data stream of the specific scalable data stream according to the one or more device requirements, wherein the sub-layer data stream is determined using the one or more metadata boxes; and
   e. extracting the sub-layer data stream from the stored scalable data stream.

* * * * *